United States Patent
Shen et al.

(10) Patent No.: US 10,777,859 B2
(45) Date of Patent: Sep. 15, 2020

(54) METHOD AND APPARATUS FOR REGENERATING BATTERY CONTAINING FLUID ELECTROLYTE

(71) Applicant: BGT MATERIALS LIMITED, Manchester (GB)

(72) Inventors: Hsiao-Hsuan Shen, Kaohsiung (TW); Kuo-Hsin Chang, Chiayi (TW); Chung-Ping Lai, Zhubei (TW)

(73) Assignee: BGT MATERIALS LIMITED, Manchester (GB)

( * ) Notice: Subject to any disclaimer, the term of this patent is extended or adjusted under 35 U.S.C. 154(b) by 161 days.

(21) Appl. No.: 16/122,052

(22) Filed: Sep. 5, 2018

(65) Prior Publication Data
US 2020/0076017 A1    Mar. 5, 2020

(51) Int. Cl.
| *H01M 10/54* | (2006.01) |
| *H01M 10/48* | (2006.01) |
| *H01M 10/42* | (2006.01) |
| *H01M 10/0525* | (2010.01) |

(52) U.S. Cl.
CPC .......... *H01M 10/54* (2013.01); *H01M 10/42* (2013.01); *H01M 10/4214* (2013.01); *H01M 10/4242* (2013.01); *H01M 10/484* (2013.01); *H01M 10/0525* (2013.01)

(58) Field of Classification Search
CPC .. H01M 10/54; H01M 10/42; H01M 10/4214; H01M 10/4242; H01M 10/484
USPC .................................. 29/763; 429/49, 63, 64
See application file for complete search history.

(56) References Cited

U.S. PATENT DOCUMENTS

| 8,557,412 | B2 | 10/2013 | Tsuchida et al. | |
|---|---|---|---|---|
| 8,728,419 | B1 | 5/2014 | Smith et al. | |
| 2005/0244704 | A1* | 11/2005 | Sloop | H01M 2/364 429/49 |
| 2010/0068605 | A1* | 3/2010 | Harris | H01M 2/361 429/47 |
| 2010/0124691 | A1* | 5/2010 | Harris | H01M 2/361 429/50 |
| 2010/0241470 | A1* | 9/2010 | Smith | G06Q 10/087 429/61 |
| 2013/0302226 | A1 | 11/2013 | Wang et al. | |
| 2014/0320061 | A1* | 10/2014 | Daniel | H01M 8/188 320/103 |
| 2016/0043450 | A1 | 2/2016 | Sloop | |

* cited by examiner

*Primary Examiner* — Gregg Cantelmo
(74) *Attorney, Agent, or Firm* — Chun-Ming Shih; LanWay IPR Services

(57) ABSTRACT

A method and an apparatus for regenerating batteries containing fluid electrolytes are revealed. The method includes the steps of: removing a case of a battery to expose a core of the battery, immersing the core in a functional electrolyte suitable for removing solid electrolyte interface (SEI) layer formed on surface of active materials, measuring characteristic parameters of the functional electrolyte during the period the core is immersed, adjusting concentration and electric conductivity of the functional electrolyte which the core is immersed therein by adding other suitable functional electrolytes according to the measured characteristic parameters until both the concentration and the electric conductivity are within a normal range of batteries or capacity of the core reaches the normal value of the battery. Thus the core is regenerated and re-packaged to form a regenerated battery.

18 Claims, 6 Drawing Sheets

METHOD AND APPARATUS FOR REGENERATING BATTERY CONTAINING FLUID ELECTROLYTE

BACKGROUND OF THE INVENTION

Field of the Invention

The present invention relates to a method and an apparatus for regenerating electrochemical energy storage devices, especially to a method and an apparatus for regenerating batteries containing fluid electrolytes.

Description of Related Art

Lithium batteries, Lithium-ion battery and high performance lithium-ion capacitors are the mainstream of electrochemical energy storage devices. The year-by-year declining cost of the lithium batteries accelerates the development of the energy storage industry. The Lithium based batteries has a competitive advantage in a plurality of applications. The energy storage system that includes lithium-ion batteries as a core is a key power system of electric vehicles. Along with the prevalence of the electric vehicles worldwide, there is a urgent need to find out solutions for the recovery of the energy storage system.

Unfortunately, there are only few methods available now for recycling spent lithium batteries. The most common ways include mechanical processes, pyrometallurgical processes (PP) and hydrometallurgy processes (HP). The mechanical processes basically are used to recycle materials of waste lithium batteries by physical ways involved in steps of rushing, collecting and sorting. They include magnetic classification, air/ballistic separation, and screening. The hydrometallurgy processes are characterized by the use of high temperatureprocesses for material recycling and composed of steps of pyrolysis, smelting, distillation and refining. Yet lithium and organic compounds are unable to be recycled by the processes. As to hydrometallurgy processes, first mechanical processes are carried out. Then crushed materials are immersed in acid or alkaline solution to be purified and extracted. The followings are certain techniques related to the recycling of spent lithium batteries.

Refer to U.S. Pat. No. 8,557,412B2, this prior art provides a method for processing a battery member, by which a cathode active material and a sulfide solid electrolyte material can be efficiently separated from each other and the cathode active material and Li contained in the sulfide solid electrolyte material can be efficiently recovered. The method comprising the steps of: bringing the battery member into contact with a process solution to generate hydrogen sulfide as well as to dissolve the Li contained in the sulfide solid electrolyte material in the process solution (contacting step), recovering the cathode active material as an insoluble component from the process solution containing the Li dissolved therein (step of recovering cathode active materials); and recovering a Li compound from the process solution, from which the cathode active material as an insoluble component is recovered (step of recovering Li compound).

Refer to US Pat. Pub. No. 20130302226A1, a method and an apparatus for recycling lithium-ion batteries are revealed. Cathode material from exhausted lithium ion batteries are dissolved in a solution for extracting the useful elements Co (cobalt), Ni (nickel), Mn (manganese), Li (lithium), and Fe (iron) to produce active cathode materials for new batteries.

Refer to U.S. Pat. No. 8,728,419B1, a process for recycling alkaline batteries is disclosed. Manganese dioxide, zinc hydroxide/oxide and steel are recovered from metal cased alkaline dry cell batteries which have been wet crushed. There is also a process for recovery of the steel and high purity manganese dioxide which can be directly utilized in the electrode for alkaline dry cell batteries.

Refer to US Pat. Pub. No. 20160043450A1, a method to recycle a positive-electrode material of a lithium-ion battery is disclosed. In an embodiment, the positive-electrode material is heated under pressure in a concentrated lithium hydroxide solution. After heating, the positive-electrode material is separated from the concentrated lithium hydroxide solution. After separating, the positive electrode material is rinsed in a basic liquid. After rinsing, the positive-electrode material is dried and sintered.

These prior arts basically provide a recycling and recovery process that includes physical or chemical reactions. For example, the physical process can be crushing of battery hardware. In the chemical process, acid and alkaline solutions are used to dissolve materials inside the spent lithium battery such as powders. The physical and chemical processes both break down the battery module, involved in large amount of energy consumption. This leads to negative effects on the natural environment. Moreover, the process takes a lot of steps to complete the recycling of the materials. During the disassembly of the spent Li batteries, a lot of pollutants such as waste gas, waste liquid and slug are generated. These hazardous wastes have negative impact on the ecosystem and human health. However, without recycling properly, valuable resources in the batteries are thrown away. In practice, recovery cost of the lithium batteries is often higher than normal market prices of the raw materials. This is due to energy consumed and time spent during the recycling process.

SUMMARY OF THE INVENTION

Therefore it is a primary object of the present invention to provide a method and an apparatus for regenerating batteries with fluid electrolytes that overcomes the above shortcomings. The batteries can be lithium-ion batteries, aluminum-ion battery or sulfur-based batteries.

In order to solve the technical problems mentioned above, a method for regenerating batteries containing fluid electrolytes includes the steps of: removing a case of a battery so that a core of the battery is exposed, immersing the core in a functional electrolyte suitable for removing solid electrolyte interface (SEI) layer so that the SEI layer formed between active materials and an electrolyte is removed by the functional electrolyte; measuring characteristic parameters of the functional electrolyte during the period the core is immersed in the functional electrolyte and the characteristic parameters including concentration and electric conductivity, adjusting the functional electrolyte composition according to the measured characteristic parameters until the characteristic parameters of the functional electrolyte are within the normal range of an electrolyte in a normal battery, and re-packaging the core to get a regenerated battery.

Preferably, the core consists of an anode, a separator, a cathode and electrodes.

Preferably, the step of immersing the core in a functional electrolyte further includes a step of keeping the functional electrolyte in a flow state.

Preferably, a voltage is applied to the core immersed in the functional electrolyte for removing the SEI layer.

Preferably, measure capacity of the core during the period the core is immersed in the functional electrolyte. The functional electrolyte composition is adjusted until the capacity measured reaches the normal level of cell capacity.

Preferably, the step of adjusting the functional electrolyte composition according to the measured characteristic parameters further includes a step of adding other functional electrolytes and/or suitable solvents into the functional electrolyte for adjustment of the ion concentration.

Preferably, the concentration of the functional electrolyte includes the Li-ion concentration.

Preferably, the functional electrolyte is recovered and stored for being used in the next regeneration cycle after the adjustment of the functional electrolyte composition.

Preferably, the characteristic parameters of the functional electrolyte the core is immersed therein are measured again after the adjustment of the functional electrolyte composition. This is to confirm that the characteristic parameters (such as ion concentration and electric conductivity) of the functional electrolyte do fall within the normal range of the battery and the capacity of the core do reaches the normal level.

An apparatus for regenerating batteries containing fluid electrolytes according to the present invention includes a container, a sensing unit, a plurality of functional-electrolyte tanks, at least one pump and a controller. The container is used to hold a core of the battery outside which a case is removed. The functional-electrolyte tanks are used to store different functional electrolytes respectively. The pump is connected to the container and the functional-electrolyte tanks by pipelines. The controller is electrically connected to the sensing unit and the pump and used to control the pump to inject one of the functional electrolytes into the container. This functional electrolyte is suitable for removing the SEI layer so that the core is immersed therein. The sensing unit includes a plurality of sensors that measure characteristic parameters of the functional electrolyte in the container during the period the core is immersed in the functional electrolyte. According to the characteristic parameters measured by the sensors, the controller controls the pump to move a suitable functional electrolyte from one of the functional-electrolyte tanks into the container. Keep moving the functional electrolyte into the container until the characteristic parameters of the functional electrolyte in the container are within the normal range of electrolytes in normal batteries.

Preferably, the functional electrolytes include a plurality of functional electrolytes with different ion concentrations and suitable solvents for the functional electrolytes.

Preferably, the container includes an inlet and an outlet. The pump is connected to the inlet of the container and the functional-electrolyte tanks by pipelines. The controller controls the pump to inject the functional electrolyte into the container through the inlet. The sensing unit is connected to the outlet of the container by another pipeline and used for measuring characteristic parameters of the functional electrolyte flowing through the outlet of the container. According to the characteristic parameters measured by the sensors, the pump moves a suitable functional electrolyte from one of the functional-electrolyte tanks into the container through the inlet under control of the controller.

Preferably, the container includes an inlet and an outlet. The pump is connected to the inlet of the container and the functional-electrolyte tanks by a multi-way valve and pipelines. The controller controls the pump and the multi-way valve to inject the functional electrolytes into the container through the inlet. The sensing unit is connected to the outlet of the container by another pipeline and used for measuring characteristic parameters of the functional electrolyte flowing through the outlet of the container. According to the characteristic parameters measured by the sensors, the pump and the multi-way valve move a suitable functional electrolyte from one of the functional-electrolyte tanks to the container through the inlet under control of the controller.

Preferably, the outlet of the container is connected to the multi-way valve by another pipeline. When the characteristic parameters of the functional electrolyte in the container are within the normal range of an electrolyte in a normal battery, the controller controls the multi-way valve to turn the functional electrolyte discharged from the outlet of the container back to one of the functional-electrolyte tanks for storage.

Preferably, the apparatus for regenerating batteries containing fluid electrolytes further includes a power output circuit electrically connected to the core of the battery outside which the case is removed. The power output circuit applies a voltage to the core of the battery without the case while the voltage applied is ranging from 0 V to 5 V.

Preferably, the apparatus for regenerating batteries containing fluid electrolytes further includes a capacity measuring circuit electrically connected to the core of the battery outside which the case is removed. The capacity measuring circuit is used to measure capacity of the core of the battery without the case. The functional electrolyte is injected until the capacity reaches the normal level.

The method and the apparatus for regenerating batteries containing fluid electrolytes of the present invention have the following benefits. In damaged batteries, different functional electrolytes are used to remove SEI layer and replace the original electrolytes therein. Thus the spent batteries are regenerated to work as good as new.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Take lithium-ion battery as an example. Lithium ions are released from active materials for the positive electrode, moving through the separator and the electrolyte, and then inserted into a porous carbon material of the negative electrode during the first charging cycle. This is the deintercalation and intercalation of lithium ions in the positive electrode. Electrons flow around the outer circuit to the negative carbon electrode. The electrolytes in the solution are reduced by the electrons and reacted with Li ions to form an interface with the thickness of about 100-120 nm. The interface is called solid electrolyte interphase, hereinafter called SEI layer. The SEI layer is usually formed between the electrodes and the electrolyte solvent by reduction-oxidation reaction of electrons, ions in electrolyte solvent and lithium ions. After accepting electrons, the electrolyte solvent molecules are connected to lithium ions to form SEI layer and some gases such as H2, CO, CH2=CH2, etc. are generated at the same time. Along with the increasing thickness, the SEI is impermeable to electrons and a passivation layer that prevents further reduction-oxidation reaction is formed.

The capacity loss or fade in Li-ion batteries is caused by several different mechanisms associated with unwanted side reactions such as irregularity of SEI layer formed on graphite anode surface, the loss of lithium ions in the electrolyte, etc. The positive and negative electrodes react with the electrolyte in charging so that the lithium ions are separated. This will cause unbalanced capacity of positive and negative electrodes. Moreover, the thicker SEI layer block blocks the insertion of lithium ions therein for charge exchange. Thus the battery capacity is reduced or the resistance tends to increase (the voltage is lower). The present method removes the SEI layer that has negative effects on the battery. During the processes of the method, the measurement of concentration and electric conductivity of the electrolytes is necessary.

Figure 1:
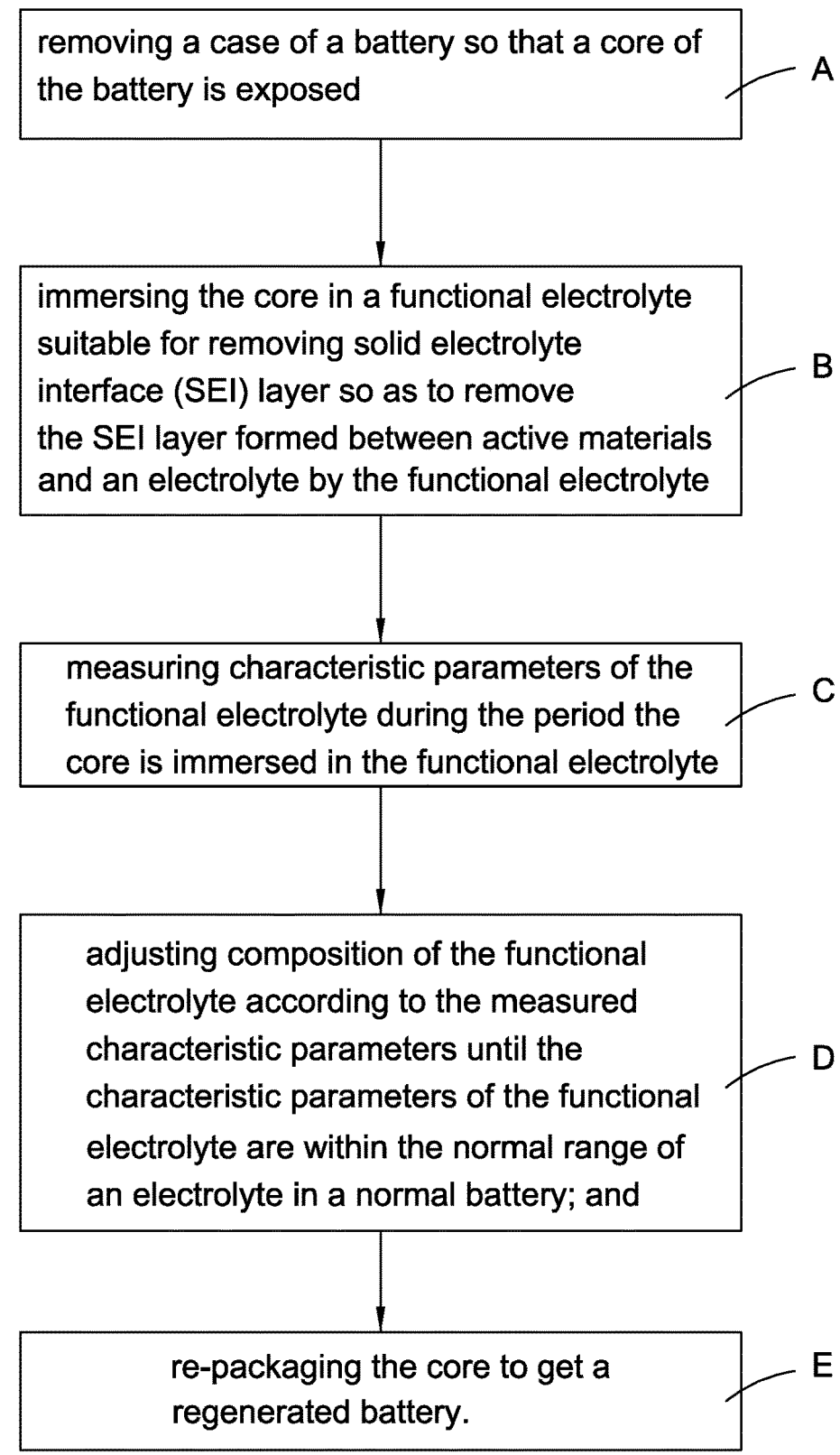
FIG. 1 is a flow chart showing steps of an embodiment according to the present invention.

Refer to FIG. 1, a flow chart showing steps of an embodiment of the present invention is revealed. A method for regenerating batteries with fluid electrolytes includes the following steps.

A. removing a case of a battery so that a core of the battery is exposed; the so-called core is composed of an anode, a separator, a cathode and electrodes.

B. immersing the core in a functional electrolyte suitable for removing solid electrolyte interface (SEI) layer so as to remove the SEI layer formed between active materials and an electrolyte by the functional electrolyte and further keeping the functional electrolyte in a flow state.

C. measuring characteristic parameters of the functional electrolyte during the period the core is immersed in the functional electrolyte and the characteristic parameters including concentration and electric conductivity.

D. adjusting composition of the functional electrolyte according to the measured characteristic parameters until the characteristic parameters of the functional electrolyte are within the normal range of an electrolyte in a normal battery.

E. re-packaging the core to get a regenerated battery.

The step of measuring characteristic parameters of the functional electrolyte is for checking whether the functional electrolyte is still able to be used according to the concentration (such as Li-ion concentration in the electrolyte solution of the Li-ion battery) and the electric conductivity among the characteristic parameters measured. In other words, the concentration can be adjusted by adding functional electrolytes with different concentrations once the concentration measured is over the normal range. Thus the concentration of the functional electrolyte goes back to the normal/usable state. As to the electric conductivity, it is also an important indicator of the functional electrolyte. The electrolyte solution with low electric conductivity makes the charging/discharging of the battery become inefficient. After measuring the concentration and the electric conductivity of the functional electrolyte, other suitable functional electrolytes are added so that the battery returns to the normal state.

In a preferred embodiment, the method further includes a step of measuring capacity of the core during the period the core is immersed in the functional electrolyte. The functional electrolyte is adjusted until the capacity reaches the initial, normal level of cell capacity. The measurement result of the capacity also shows whether the SEI layer has been removed properly.

In an embodiment, the functional electrolyte suitable for removing SEI layer is a typical electrolyte with carbonate salt, and/or alcohol group and/or ketone group. The functional electrolyte is formed by chemicals with functional groups such as carbonate ester and aqueous solution including alcohols and ketones. The general structure of carbonate ester is R1O—CO—O R2 while R1 and R2 can be hydrogen, methyl group, ethyl group or aromatic group. The following is the chemical structure of the carbonate ester.

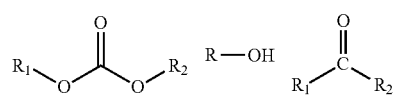

In the step D, basically different functional electrolytes are injected into the functional electrolyte in which the core is immersed until the characteristic parameters of the functional electrolyte return to the normal range of an electrolyte in a normal battery. In order to run the step D, a plurality of different functional electrolytes is provided. These functional electrolytes include functional electrolytes with different concentrations of ions and suitable solvents therefor.

Figure 2:
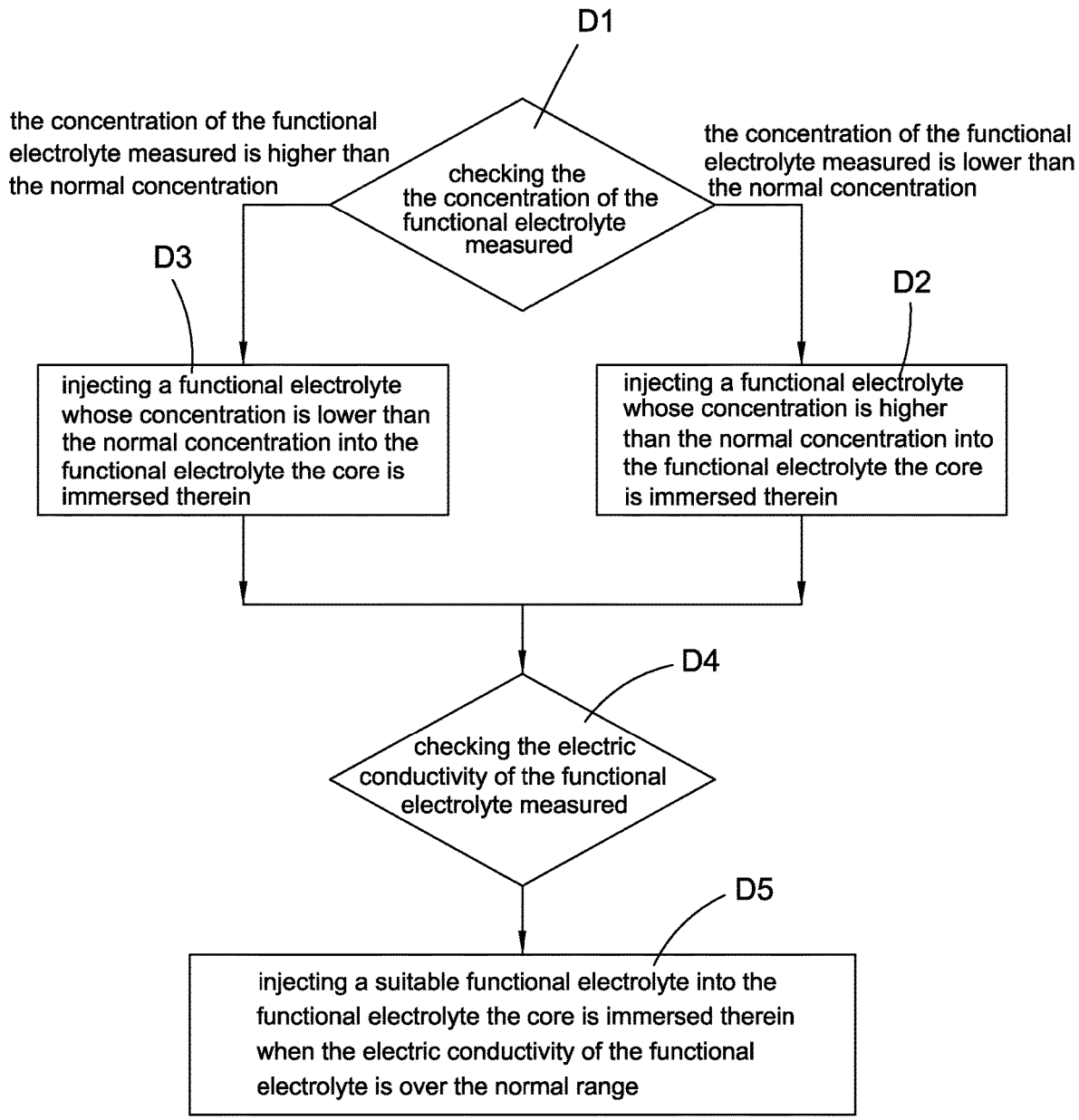
FIG. 2 is a schematic block diagram showing operation flow of n embodiment according to the present invention.

Refer to FIG. 2, a flow chart of an embodiment of the above step D is disclosed. The step D of adjusting the functional electrolyte composition according to the measured characteristic parameters consists of the following steps.

D1. checking whether the concentration of the functional electrolyte (such as Li-ion concentration) measured matches that of an electrolyte in a normal battery.

D2. injecting a functional electrolyte whose concentration is higher than the normal concentration into the functional electrolyte the core is immersed therein when the concentration of the functional electrolyte measured is lower than the normal concentration.

D3. injecting a functional electrolyte whose concentration is lower than the normal concentration into the functional electrolyte the core is immersed therein when the concentration of the functional electrolyte measured is higher than the normal concentration.

D4. checking whether the electric conductivity of the functional electrolyte measured matches that of an electre in a normal battery.

D5. injecting a suitable functional electrolyte into the functional electrolyte the core is immersed therein when the electric conductivity of the functional electrolyte is the normal range.

In a preferred embodiment, a voltage is applied to the core immersed in the functional electrolyte for removing the SEI layer. The voltage applied is ranging from 0 volt (V) to 5 volts (V).

Figure 3:
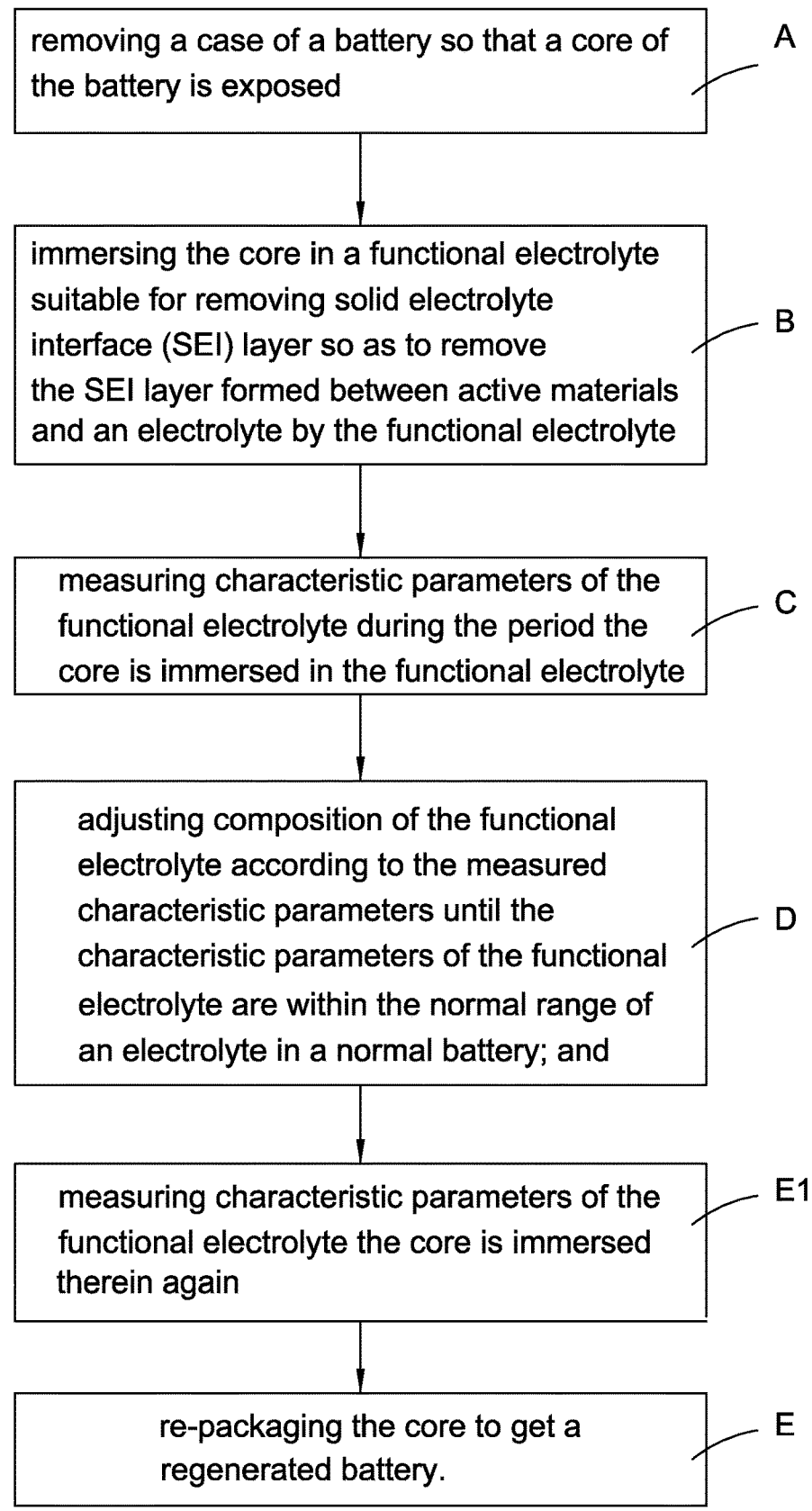
FIG. 3 is a flow chart showing steps of another embodiment according to the present invention.

Refer to FIG. 3, another embodiment is revealed. The method of the present invention further includes a step E1, measuring characteristic parameters of the functional electrolyte the core is immersed therein again after adjustment of the functional electrolyte composition. This is to confirm that the characteristic parameters (such as ion concentration and electric conductivity) of the functional electrolyte do match the normal range of the usable battery and the capacity of the core do reaches the normal level.

In a preferred embodiment, after the step of adjusting composition of the functional electrolyte, the functional electrolyte is recovered and stored for being used in the next regeneration cycle.

Figure 4:
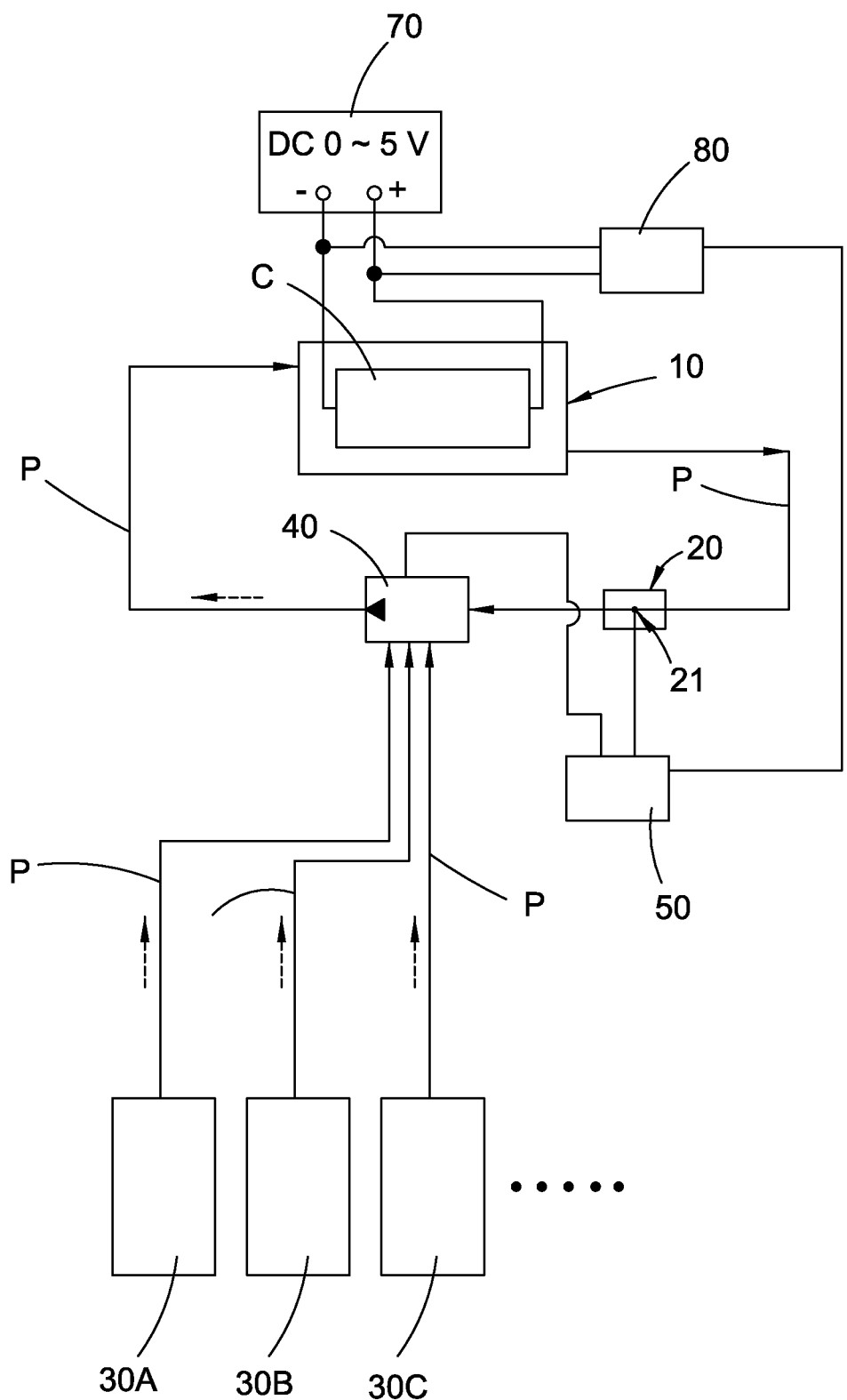
FIG. 4 is a functional block diagram of an embodiment according to the present invention.

Refer to FIG. 4, a functional block diagram of an apparatus for regenerating batteries containing fluid electrolytes according to the present invention is revealed. The apparatus for regenerating batteries containing fluid electrolytes includes a container 10, a sensing unit 20, a plurality of functional-electrolyte tanks 30A-30D, at least one pump 40 and a controller 50.

The container 10 is used to hold a core C of the battery outside which the case has been removed already. The core C is fixed in the container 10 by a support or a fixing member. Different batteries require different functional electrolytes. Thus different functional electrolytes are stored in different functional-electrolyte tanks 30A-30D respectively for being used in battery regenerating procedure. The pump 40 are connected to the container 10 and the functional-electrolyte tanks 30A-30D by pipelines P. The controller 50 is electrically connected to the sensing unit 20 and the pump 40. The controller 50 controls the pump 40 to move one functional electrolyte suitable for removing SEI layer from one of the functional-electrolyte tanks 30A-30D into the container 10 (such as the functional electrolyte in the functional-electrolyte tank 30A). Thus the core C is immersed in the functional electrolyte. The sensing unit 20 includes a plurality of sensors 21 that measures the characteristic parameters of the functional electrolyte in the container 10 during the period the core C is immersed in the functional electrolyte. Then according to the characteristic parameter measured by the sensors 21, the controller 50 controls the pump 40 to move one suitable functional electrolyte from one of the functional-electrolyte tanks 30A-30D into the container 10 for adjusting the functional electrolyte composition. Keep filling the container 10 with the functional electrolyte until the characteristic parameters of the functional electrolyte in the container 10 are within the normal range of the electrolyte in normal batteries. The functional electrolytes include a plurality of functional electrolytes with different ion concentrations and suitable solvents therefor.

Figure 5:
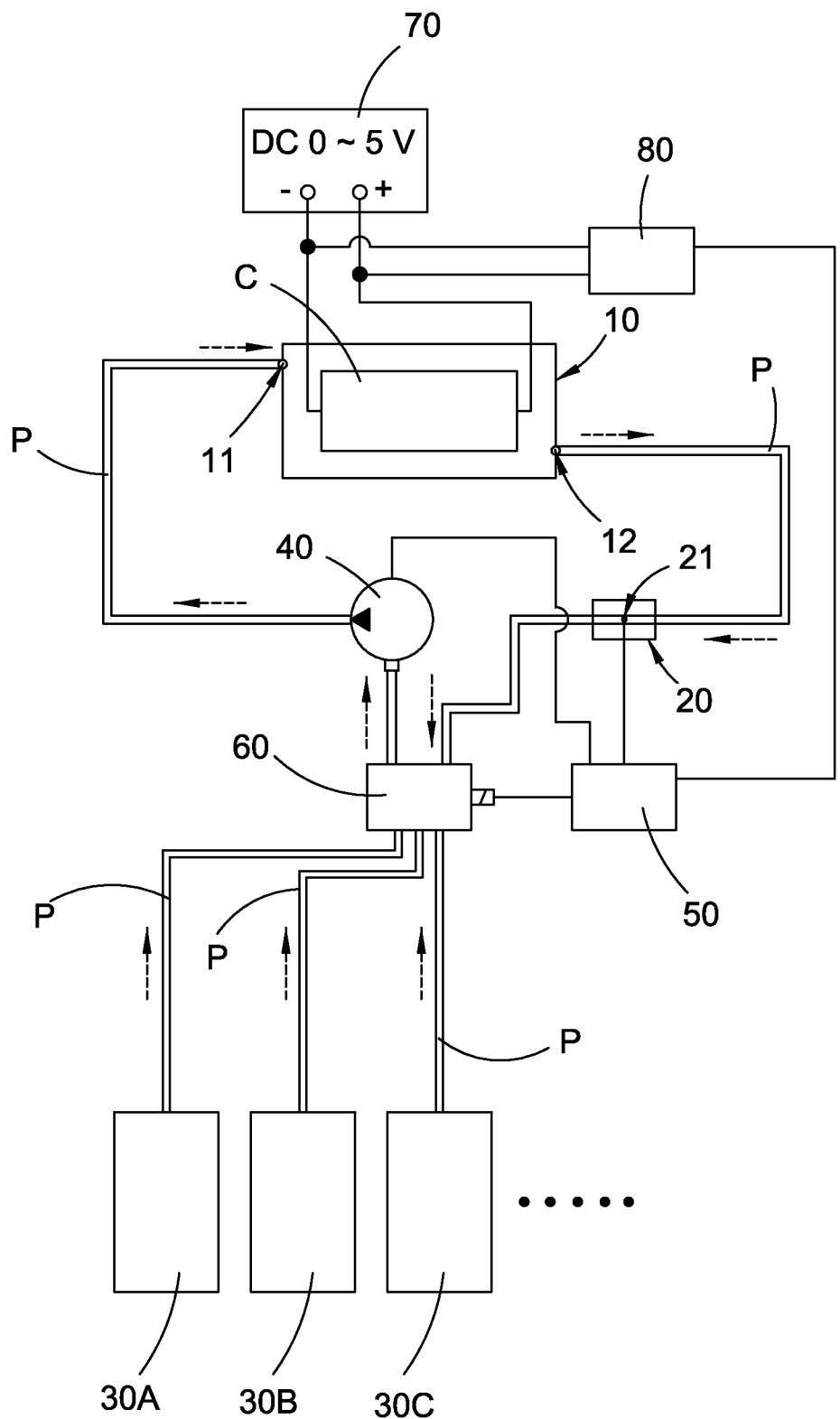
FIG. 5 is a functional block diagram of another embodiment according to the present invention.

Preferably, keep the functional electrolyte in a flow state after the core C being placed into the container 10 and immersed in the functional electrolyte. This can improve the washing effects and enhance the removal of the SEI layer. Refer to FIG. 5, one of the ways to achieve the flowing of the functional electrolyte is disclosed. The container 10 includes an inlet 11 and an outlet 12. The pump 40 is connected to the inlet 11 of the container and the functional-electrolyte tanks 30A-30D by pipelines P respectively. The controller 50 controls the pump 40 to inject the functional electrolyte into the container 10 through the inlet 11. The sensing unit 20 is connected to the outlet 12 of the container 10 by another pipeline P and used for measuring characteristic parameters of the functional electrolyte flowing through the outlet 12 of the container 10. According to the characteristic parameters measured by the sensors 21, the pump 40 moves one of the functional electrolytes from one of the functional-electrolyte tanks 30A-30D into the container 10 through the inlet 11 under control of the controller 50. Thereby the above design keeps the functional electrolyte the core C is immersed therein in a flow state.

Figure 6:
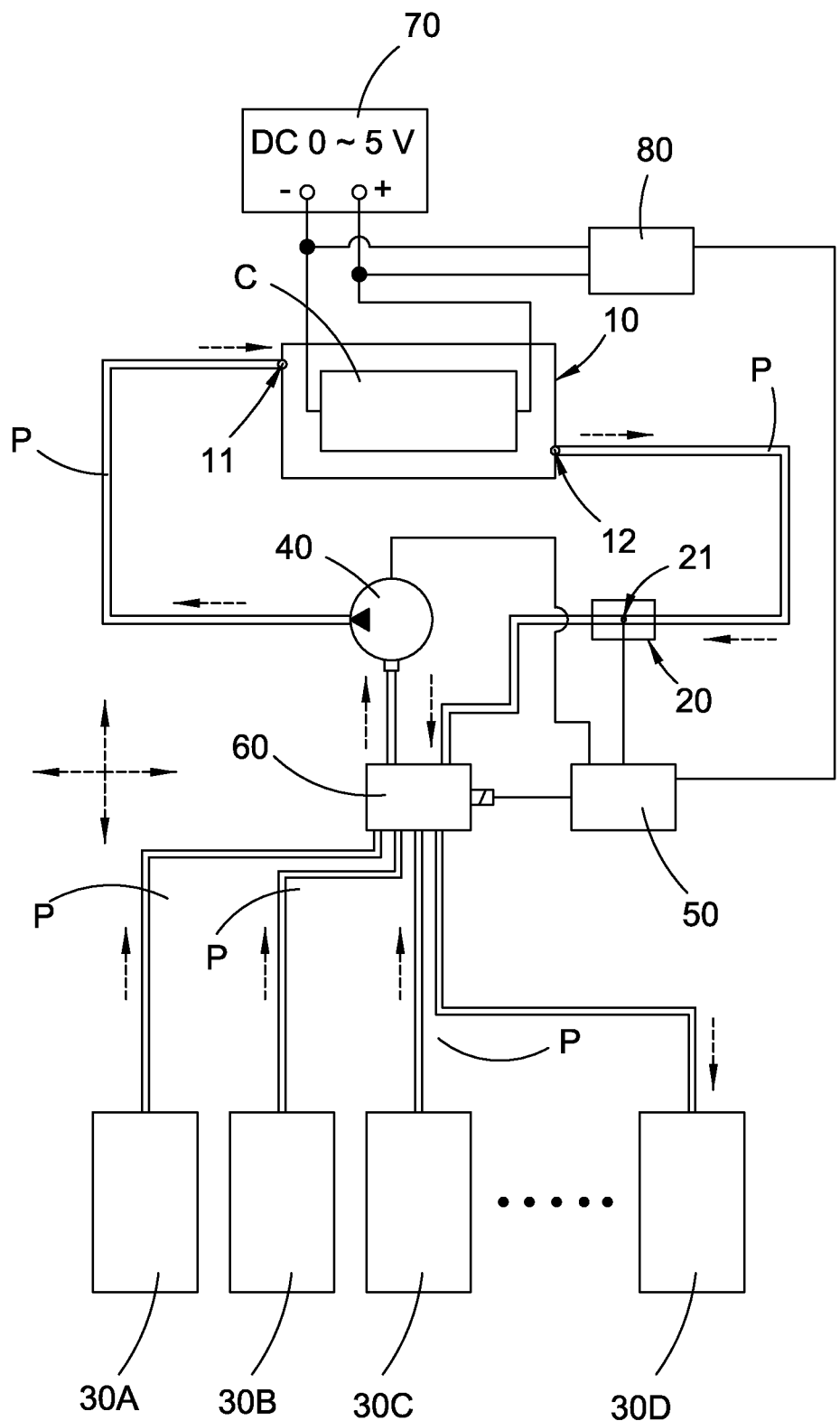
FIG. 6 is a functional block diagram of a further embodiment according to the present invention.

Refer to FIG. 6, a further embodiment is revealed. In this embodiment, the container 10 includes an inlet 11 and an outlet 12. The pump 40 is connected to the inlet 11 of the container 10 and the functional-electrolyte tanks 30A-30D by a multi-way valve 60 and pipelines P. The controller 50 controls the pump 40 and the multi-way valve 60 to inject the functional electrolytes into the container 10 through the inlet 11. The sensing unit 20 is connected to the outlet 12 of the container 10 by another pipeline P and used for measuring characteristic parameters of the functional electrolyte flowing through the outlet 12 of the container 10. According to the characteristic parameters measured by the sensor 21, the pump 40 and the multi-way valve 60 move one suitable functional electrolyte from one of the functional-electrolyte tanks 30A-30D to the container 10 through the inlet 11 under control of the controller 50.

The outlet 12 of the container 10 is connected to the multi-way valve 60 by another pipeline P. When the characteristic parameters of the functional electrolyte in the container 10 are within the normal range of the electrolyte in normal batteries, the controller 50 controls the multi-way valve 60 to turn the functional electrolyte discharged from the outlet 12 of the container 10 back to one of the functional-electrolyte tanks 30A-30D for storage. For example, the functional electrolyte discharged can be redirected to the functional-electrolyte tank 30A in which the functional electrolyte is used for removing the SEI layer, or redirected to the functional-electrolyte tank 30D only for recovery of the functional electrolyte. In other words, the functional electrolyte in the functional-electrolyte tank 30D only for recovery is used to rebalance the electrolyte solution. For instance, the electrolyte solution in the Li-ion battery contains the proper Li-ion concentration and the proper conductivity. Thus the functional electrolyte in the functional-electrolyte tank 30D only for recovery can be directly injected into a new case of the regenerated core C to form a regenerated battery.

Refer to FIG. 4, the apparatus for regenerating batteries containing fluid electrolytes further includes a power output circuit 70 electrically connected to the core C. The power output circuit 70 applies a voltage to the core C for removing SEI layer during the period the core C is immersed in the functional electrolyte. The voltage applied is ranging from 0 V to 5 V.

The apparatus for regenerating batteries containing fluid electrolytes further includes a capacity measuring circuit 80 electrically connected to the core C. The capacity measuring circuit 80 is used to measure the capacity of the core C during the period the core C is immersed in the functional electrolyte. Stop adding the functional electrolyte once the capacity reaches the normal level.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An apparatus for regenerating batteries containing fluid electrolytes comprising:
   a container that is used to hold a core of a battery outside which a case is removed;
   a plurality of functional-electrolyte tanks used for storing different functional electrolytes therein respectively;
   a pump that is connected to the container and the functional-electrolyte tanks by pipelines;
   a sensing unit having a plurality of sensors that measure characteristic parameters of the functional electrolyte in the container during a period the core is immersed in the functional electrolyte; and a controller electrically connected to the sensing unit and the pump, and used to control the pump to move one of the functional electrolytes suitable for removing solid electrolyte interface (SEI) layer into the container so that the core is immersed in the functional electrolyte;

wherein the controller controls the pump to move one of the functional electrolytes from one of the functional-electrolyte tanks into the container according to the characteristic parameters measured by the sensors; the functional electrolyte is filled in the container until the characteristic parameters of the functional electrolyte in the container are within a range of an electrolyte in the battery.

2. The apparatus as claimed in claim 1, wherein the functional electrolytes include a plurality of functional electrolytes with different ion concentrations and suitable solvents therefor.

3. The apparatus as claimed in claim 1, wherein the container includes an inlet and an outlet; the pump is connected to the inlet of the container and the functional-electrolyte tanks by pipelines; the controller controls the pump to inject the functional electrolyte into the container through the inlet; the sensing unit is connected to the outlet of the container by another pipeline for measuring characteristic parameters of the functional electrolyte discharged from the outlet of the container; the controller controls the pump to move one of the functional electrolytes from one of the functional-electrolyte tanks to the container through the inlet according to the characteristic parameters measured by the sensors.

4. The apparatus as claimed in claim 1, wherein the container includes an inlet and an outlet; the pump is connected to the inlet of the container and the functional-electrolyte tanks by a multi-way valve and pipelines; the controller controls the pump and the multi-way valve to inject the functional electrolytes into the container through the inlet; the sensing unit is connected to the outlet of the container by another pipeline for measuring characteristic parameters of the functional electrolyte discharged from the outlet of the container; according to the characteristic parameters measured by the sensors, the pump and the multi-way valve move one of the functional electrolytes from one of the functional-electrolyte tanks into the container through the inlet under control of the controller.

5. The apparatus as claimed in claim 4, wherein the outlet of the container is connected to the multi-way valve by another pipeline; the controller controls the multi-way valve to turn the functional electrolyte discharged from the outlet of the container back to one of the functional-electrolyte tanks for storage when the characteristic parameters of the functional electrolyte in the container are within the range.

6. The apparatus as claimed in claim 1, wherein the apparatus further includes a power output circuit electrically connected to the core of the battery outside which the case is removed; the power output circuit applies a voltage to the core of the battery without the case while the voltage applied is ranging from higher than 0 V to 5 V.

7. The apparatus as claimed in claim 1, wherein the apparatus further includes a capacity measuring circuit electrically connected to the core of the battery outside which the case is removed; the capacity measuring circuit is used to measure capacity of the core of the battery without the case; the functional electrolyte is filled into the container until the capacity measured reaches a level.

8. A method for regenerating batteries containing fluid electrolytes comprising the steps of:
removing a case of a battery so that a core of the battery is exposed;
immersing the core in a functional electrolyte suitable for removing solid electrolyte interface (SEI) layer so as to remove the SEI layer formed between active materials and an electrolyte by the functional electrolyte;
measuring characteristic parameters of the functional electrolyte during the period the core is immersed in the functional electrolyte and the characteristic parameters including concentration and electric conductivity;
adjusting the functional electrolyte composition according to the measured characteristic parameters until the characteristic parameters of the functional electrolyte are within a range of an electrolytes in the battery; and
re-packaging the core to get a regenerated battery.

9. The method as claimed in claim 8, wherein the core includes an anode electrode, a separator, and a cathode electrode.

10. The method as claimed in claim 8, wherein the step of immersing the core in a functional electrolyte further includes a step of keeping the functional electrolyte in a flow state.

11. The method as claimed in claim 8, wherein the step of immersing the core in a functional electrolyte further includes a step of applying a voltage to the core immersed in the functional electrolyte for removing the SEI layer and the voltage is ranging from higher than 0V to 5V.

12. The method as claimed in claim 10, wherein the step of immersing the core in a functional electrolyte further includes a step of applying a voltage to the core immersed in the functional electrolyte for removing the SEI layer and the voltage is ranging from higher than 0V to 5V.

13. The method as claimed in claim 8, wherein the method further includes a step of measuring capacity of the core during the period the core is immersed in the functional electrolyte and adjusting the functional electrolyte in the container until the capacity measured reaches a level.

14. The method as claimed in claim 8, wherein the step of adjusting the functional electrolyte composition according to the measured characteristic parameters further includes a step of adding at least one other functional electrolyte and/or at least one solvent suitable for the functional electrolyte into the functional electrolyte for adjusting ion concentration of the functional electrolyte.

15. The method as claimed in claim 8, wherein the concentration of the functional electrolyte includes lithium ion concentration.

16. The method as claimed in claim 8, wherein the method further includes a step of recovering and storing the functional electrolyte for being used in a next regeneration cycle after the step of adjusting the functional electrolyte composition.

17. The method as claimed in claim 13, wherein the method further includes a step of recovering and storing the functional electrolyte for being used in a next regeneration cycle after the step of adjusting the functional electrolyte composition.

18. The method as claimed in claim 8, wherein the method further includes a step of measuring the characteristic parameters of the functional electrolyte the core is immersed therein again after the step of adjusting the functional electrolyte composition.

* * * * *